United States Patent [19]

Luscher et al.

[11] Patent Number: 5,746,850
[45] Date of Patent: May 5, 1998

[54] DOUBLE INNER TUBE AND VALVE SYSTEM

[76] Inventors: Marcus P. Luscher, P.O. Box 1836, Nederland, Colo. 80466; Stephen F. Ridley, 600 Arapahoe Ave., No. 6, Boulder, Colo. 80302

[21] Appl. No.: 638,549

[22] Filed: Apr. 26, 1996

[51] Int. Cl.$^6$ .............................. B60C 5/22; B60C 17/01
[52] U.S. Cl. ...................... 152/339.1; 152/342.1; 152/511; 152/519; 137/223; 137/271
[58] Field of Search .......................... 152/339.1, 342.1, 152/511, 519, DIG. 7, DIG. 13; 137/223, 234.5, 271

[56] References Cited

U.S. PATENT DOCUMENTS

| | | | |
|---|---|---|---|
| 524,736 | 11/1894 | Jenness | 137/223 |
| 661,174 | 11/1900 | Goss | 152/DIG. 7 |
| 804,613 | 11/1905 | Magowan | 137/223 |
| 2,039,343 | 5/1936 | Prokul | 137/223 |
| 2,272,548 | 2/1942 | Creamer . | |
| 2,273,457 | 2/1942 | Zimmerman . | |
| 2,354,912 | 8/1944 | Eger . | |
| 3,192,943 | 7/1965 | Moen | 137/271 |
| 3,318,325 | 5/1967 | Siedow . | |
| 4,008,743 | 2/1977 | Welch . | |
| 4,143,697 | 3/1979 | Igea et al. . | |
| 4,216,809 | 8/1980 | Pixley . | |
| 4,293,017 | 10/1981 | Lambe . | |
| 4,765,358 | 8/1988 | Cady . | |
| 4,995,438 | 2/1991 | Weber et al. . | |
| 5,109,905 | 5/1992 | Lambe . | |
| 5,301,729 | 4/1994 | Blair . | |
| 5,385,191 | 1/1995 | Aflague et al. . | |

FOREIGN PATENT DOCUMENTS

| | | |
|---|---|---|
| 380823 | 12/1907 | France . |
| 585682 | 2/1947 | United Kingdom . |
| 851808 | 10/1960 | United Kingdom . |

*Primary Examiner*—Richard Crispino
*Attorney, Agent, or Firm*—John R. Wahl; Lee R. Osman; Hollard & Hart LLP

[57] ABSTRACT

A double inner tube and valve system for use in a wheel assembly including a circular rim with a base wall and opposing radially extending flanges defining a well, and an aperture formed in said base wall. A tire is mounted on the rim, and defines an annular cavity in conjunction with the rim. The double inner tube is positioned in the annular cavity and defines an inflatable primary tube adjacent to the tire, and an inflatable secondary tube positioned between the primary tube and the rim. A valve assembly is attached to the double inner tube and positioned in the aperture in the rim. The valve assembly comprises a primary valve in fluid communication with the primary tube to allow inflation of the primary tube and a secondary valve which replaces the primary valve and is in fluid communication with the secondary tube for inflation of the secondary tube. The valve assembly is selectively configurable to inflate the primary tube or the secondary tube.

15 Claims, 8 Drawing Sheets

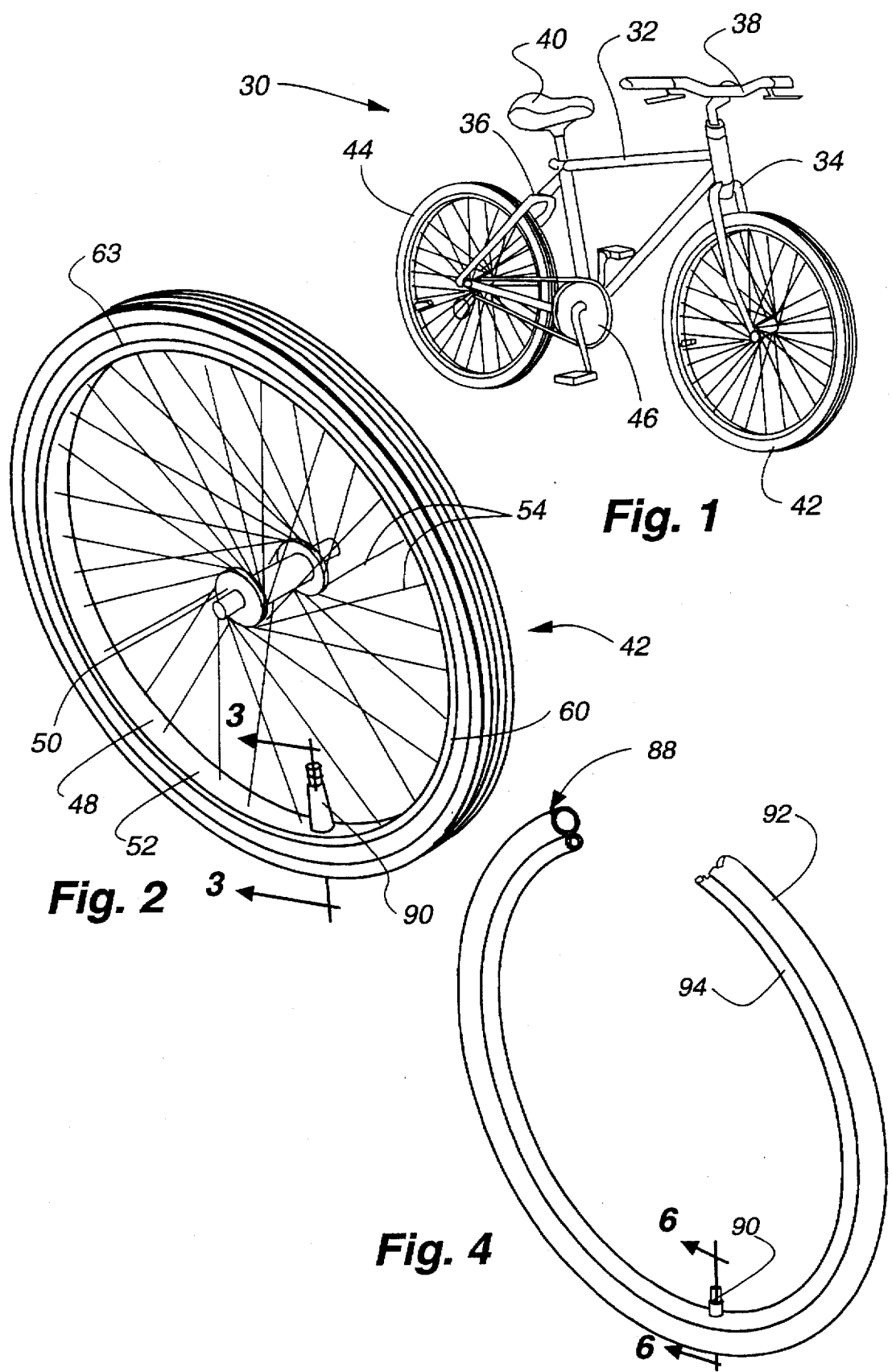

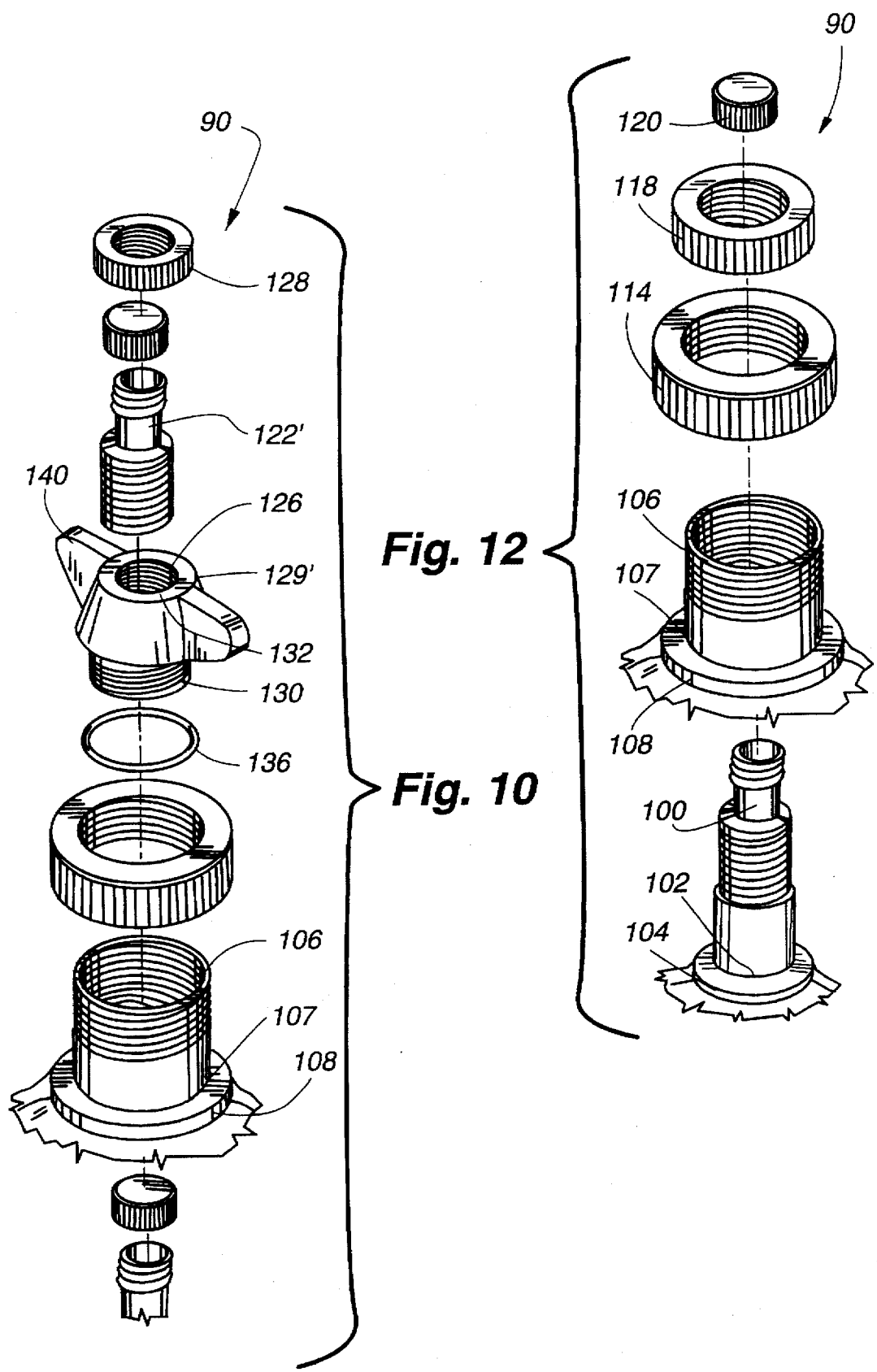

DOUBLE INNER TUBE AND VALVE SYSTEM

FIELD OF THE INVENTION

This invention relates to inner tubes for tire systems, and more particularly to a new and improved inner tube for bicycle tires allowing a user to inflate a secondary tube after a primary tube has become flat, without removing the tire from the rim or the rim from the bicycle.

BACKGROUND OF THE INVENTION

Cycling sports have increased in popularity recently, especially in the areas of road bicycles and mountain bicycles (generally, bikes). Wheel assemblies on most bikes typically comprise a wheel rim, a tire, and an inner tube positioned inside the tire between the wheel rim and the tire. The inner tube is inflated with air to create an air cushion between the tire and the rim.

One of the major problems associated with cycling is the occurrence of flat tires. Flat tires occur when the tube is damaged to the point that a hole develops in the tube, letting the pressurized air escape. For instance, a flat can occur when the outer tire is impacted by a curb or rock and the tire is compressed to the point where it impacts the rim and the tube is thereby "pinched" between the rim and the outer tire, thus potentially causing a "pinch-hole" in the tube. Pinch flats are a common occurrence. More typically, a sharp object, such as a nail, may pierce the outer tire and puncture the inner tube. When a rider has a flat tire, the rider must stop riding in order to avoid damaging the expensive rim. Many different circumstances can cause flat tires.

The wheels on road bikes have been reduced in size to save weight and make the bicycle more aerodynamic. The reduction in weight has been accomplished to a large extent by reducing the size, and thus generally strength, of the components. Wheels have been reduced in width and cross sectional dimensions to the point where they are no longer robustly sturdy. Typically, a road bike tire is approximately ¾ in width and requires 100 to 140 psi. This reduction in physical structure makes the wheels on road bikes more susceptible to damage from objects, such as thorns and nails, and even pot holes and other common road features.

Mountain bikes are used in an entirely different manner than road bikes. Mountain bikes are generally built for rugged use, such as on dirt roads and single track trails. Because mountain bikes are ridden under more rigorous conditions than road bikes, mountain bikes have more sturdily built components. Mountain bike tires are typically 1.25 to 2.25 inches in width, have very thick and aggressive tread patterns, and require 40 to 65 psi. Nonetheless, flat tires are also a problem with mountain bikes since they are ridden over logs and curbs, and are generally exposed to situations where flat tires are likely to occur. Oftentimes, riders will decrease air pressure to increase traction in off-road situations. The downside to decreasing tire pressure is that the tires are then more susceptible to certain types of flats.

When a flat tire occurs, the rider has only a few options available for resolving the problem. Until fairly recently, the only feasible solution was to remove the wheel from the frame, then remove the tire from the rim to access the tube, find the hole in the tube, patch the hole or replace the tube, and reassemble the wheel. The patching method, while inexpensive and ultimately the proper solution, is labor intensive. If the rider does not have the proper equipment to patch the tube, the rider must carry or walk the bike to avoid damaging the rim. If the rider is in a race, having to disassemble the wheel to patch the tube uses up valuable time. Also, the rider is required to carry spare tubes and tools necessary to remove the wheel from the frame, and the tire from the wheel.

Other solutions have recently been developed to address the problem with flat tires, with many of the inventions focusing on redesigning the tube system. One available solution is the solid inner tube. The solid inner tube is supposed to avoid flats by virtue of the fact that there is no air to escape from the inner tube. However, solid inner tubes do not always have the desired effective tire pressure, and the tire pressure is not adjustable.

Other solutions have been developed, and particularly relate to a "tube within a tube" system. Generally, this type of system requires a secondary tube to be positioned inside the primary tube, often attached along a common wall. The outer, or primary tube, is initially inflated with air for use in supporting the tire on the rim. The secondary tube is inside the primary tube and is not inflated. When the primary tube is punctured, the secondary tube can be filled with air to allow the rider to continue without having to remove the tire and patch the tube.

The valve arrangements in the dual tube devices, however, are often complex and can require substantial modification to the rim to allow for inflation of the secondary tube. For instance, some designs require that there be a separate valve for each tube, each valve having a unique position on the rim.

Also, the available "tube within a tube" systems do not adequately alleviate the pinch-hole or puncture problem. The positioning of the secondary tube within the primary tube often exposes the secondary tube to being caught between the tire and the rim, along with the primary tube, thus potentially resulting in a pinch-hole in both the primary and secondary tubes. The secondary tube is also subject to being punctured by the same sharp object that punctures the primary tube.

There is missing in the art a dual tube system that satisfactorily addresses the problems set forth above. It is in this light that the double tube system of the present invention was developed.

SUMMARY OF THE INVENTION

The instant invention overcomes the inadequacies of the prior art with respect to fixing flat tires. In particular, a double tube and valve system is disclosed for use with a conventional circular bicycle rim having a base wall and opposing radially extending flanges defining a well. An aperture formed in the base wall for receipt of a valve stem. A tire is mounted on the rim so as to define an annular cavity in conjunction with the rim. The inner tube of the present invention is positioned in the annular cavity and comprises an inflatable primary tube adjacent to the tire and an inflatable secondary tube between the primary tube and the rim. Typically, the secondary tube is collapsed in the well when the primary tube is inflated and the primary tube is collapsed against the tire when the secondary tube is inflated.

A valve assembly is attached to the inner tube and inserted through the aperture in the rim. The valve assembly comprises a secondary valve member valve shoulder adapted to alternately receive and support a primary valve in fluid communication with the primary tube to allow inflation of the primary tube or a secondary valve in fluid communication with the secondary tube for inflation of the secondary tube. The valve assembly is selectively configurable to inflate the primary tube or the secondary tube.

More specifically, the valve assembly includes a valve shoulder positionable in the aperture formed in the rim and attached in fluid communication with the secondary tube. A primary valve is removably positioned in a center bore in the valve shoulder to be in fluid communication with the primary tube. The primary valve has an outer diameter smaller than the diameter of the center bore to allow the primary valve to be selectively moved through the center bore and into the secondary tube.

The primary and secondary tubes have a common wall and the primary valve is attached in fluid communication to the primary tube through the common wall.

In initial use, the primary valve is positioned in the valve shoulder for operative use in inflating the primary tube. If the primary tube becomes unusable due to a puncture or the like, the primary valve is released from the valve shoulder, forced into the interior of the secondary tube and replaced with the secondary valve in the valve shoulder, which can then be used to inflate the secondary tube.

Although specific embodiments of the invention have been described herein for purposes of illustration, various modifications may be made without deviating from the spirit and scope of the invention. Accordingly, the invention is not limited except as by the appended claims.

BRIEF DESCRIPTION OF THE DRAWINGS

FIG. 1 is a perspective view of a bicycle having wheel assemblies incorporating the inner tube of the present invention.

FIG. 2 is a perspective view of a wheel assembly incorporating the double inner tube and valve system of the present invention

FIG. 4 is a perspective view of a double tube and valve system with parts removed for clarity.

FIG. 10 is a fragmentary perspective of the valve system of the present invention incorporating the secondary valve stem.

FIG. 12 is an exploded perspective of the valve system of the present invention incorporating the primary valve stem.

DESCRIPTION OF THE PREFERRED EMBODIMENTS

Figure 3:
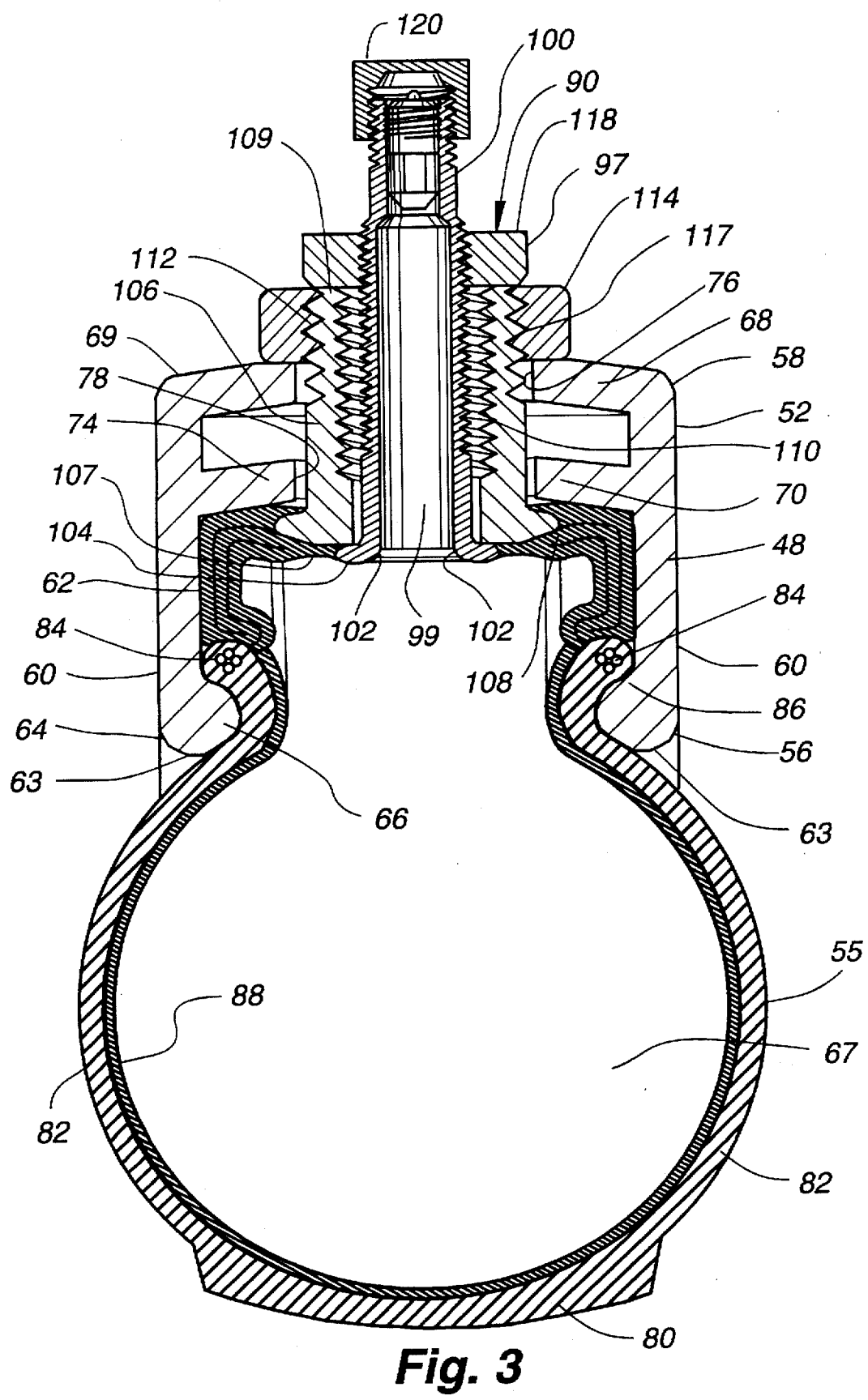
FIG. 3 is an enlarged section taken along line 3—3 of FIG. 2.

A bicycle 30 incorporating the double inner tube and valve system of the present invention is shown in FIG. 1. The bicycle 30 comprises a central frame 32 having front forks 34, rear forks 36, a handle bar 38 able to control the movement of the front forks 34 for steering purposes, a seat 40, a front wheel assembly 42 and a rear wheel assembly 44 positioned in the front 34 and rear 36 forks, respectively, and a drive train 46 connected between a lower portion of the frame and the rear wheel assembly 44 to allow the rider to propel the bicycle 30 along a support surface (not shown). The double inner tube and valve assembly of the present invention resides in the front 42 and rear 44 wheel assemblies, as is described in more detail below.

The wheel assemblies 42, 44 connected to the front 34 and rear 36 forks of the bicycle 30 are identical to one another. For purposes of this description, reference will be made to the front wheel assembly 42. As shown in FIG. 2, the front wheel assembly 42 comprises a wheel rim 48 which has an axle hub 50, a circular rim member 52 concentrically positioned around the axle hub by a plurality of spokes 54, an outer tire 55, an inner tube not shown and a valve assembly 90. Referring to FIG. 3, the circular rim member 52 is shown as having a radially outer portion 56 and a radially inner portion 58. The radially outer portion 56 has opposing radially-extending flanges 60 which define an annular well 62 which runs continuously along the outer circumference 63 of the rim member. The radially-extending flanges 60 have a terminating edge 64 which defines a continuous inwardly-extending rounded protrusion 66.

The inner portion 58 of the wheel rim member 52 comprises a base wall 68 continuous along the inner circumference 69 of the wheel rim member 52, and a support wall 70 positioned between the inner 69 and outer 63 circumferences of the wheel rim member 52. The support wall 70 defines the base 74 of the annular well 62. At one point along the circumference of the rim member 52, apertures 76 and 78 are formed through the base wall 68 and the support wall 70, respectively, for receiving the valve assembly 90. The rim member 52 is typically made of steel or aluminum, but can be made of other suitable materials.

The tire 55 is attached along the outer circumference 56 of the wheel rim member 52 to provide satisfactory engagement of the wheel assembly 42 with the support surface (not shown). The tire 55 is typically comprised of rubber and defines an outer tread area 80 integrally formed with two opposing side walls 82, each terminating in a continuous annular bead 84. The tire 55 is mounted to the rim member 52 by positioning the beads 84 in engagement with the rounded protrusions 66 on the flanges 60, as shown in FIG. 3, and thereby forming an annular cavity 67 between the tire and the rim member. The beads 84 rest on the radially inner side 86 of the inwardly-extending protrusions 66 such that when the air pressure inside the tire 55 is sufficiently high, the beads 84 engage the protrusions 66 to maintain a relatively inseparable connection of the tire with the wheel rim during use. The description of the wheel assembly 42 to this point relates to a structure well known in the art for use in both road bikes and mountain-bike style wheel assemblies.

Typically, air pressure is maintained inside the tire 55 by an inner tube, which assists in maintaining the engagement of the tire 55 to the rim member 52. A typical inner tube (not shown) is a tube having a circular or donut shape, defining an interior chamber which is pneumatically sealed, and which has a valve in communication with the inner chamber to allow air to be selectively pumped into and released out of the inner chamber. The inner tube is placed in the well of the tire rim, the tire is then positioned around the inner tube to engage the beads with the rim flanges, and the inner tube is finally pumped up to increase the air pressure, which as described above, facilitates the engagement of the beads against the protrusions, and ultimately the tire with the rim. The valve is inserted through the aperture in the rim to allow easy access to the valve for increasing and decreasing the tire pressure.

Figure 5:
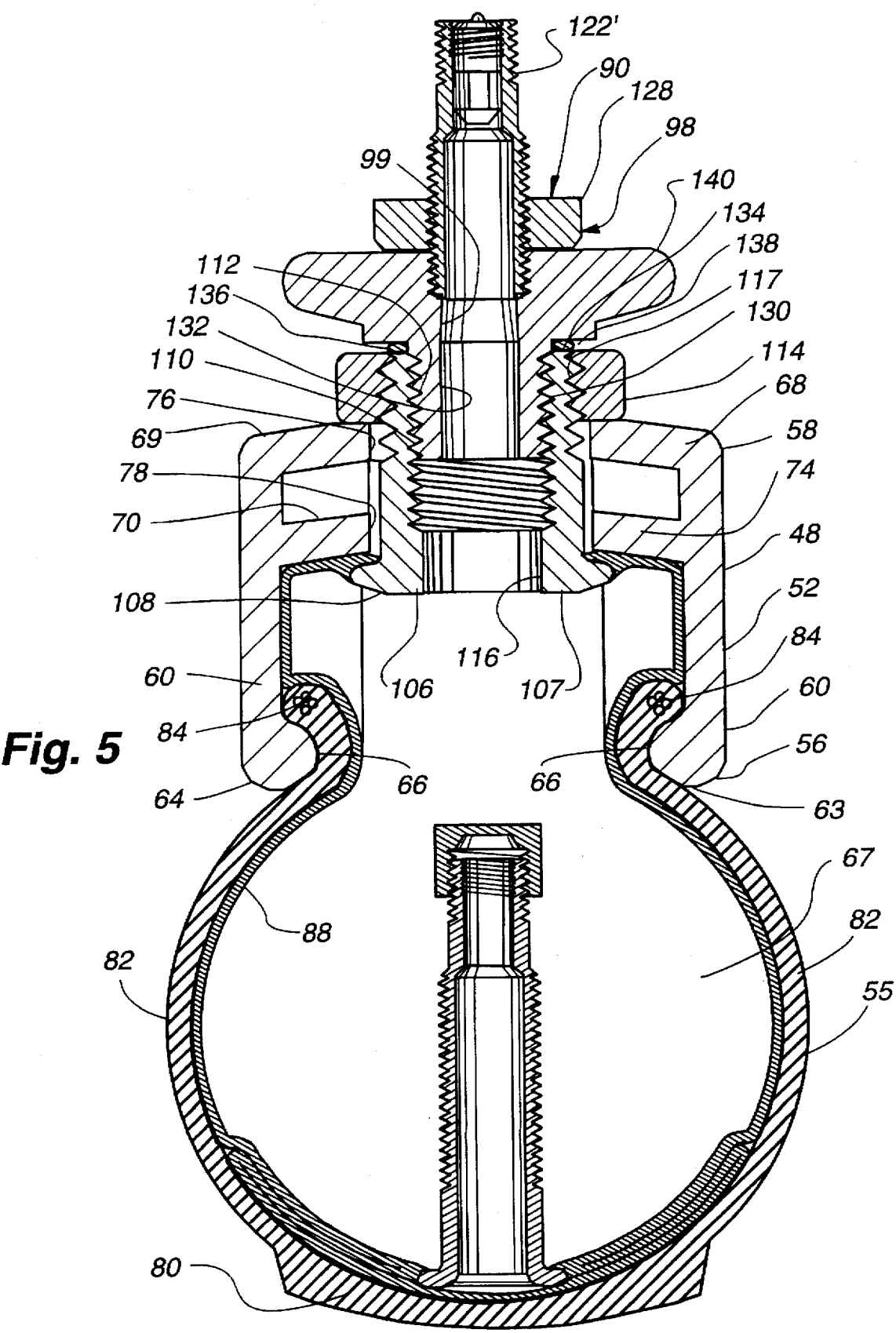
FIG. 5 is an enlarged section taken along line 5—5 of FIG. 9.

The present invention resides in a combination of a dual tube 88 and dual valve assembly 90 as best seen in FIGS. 3, 4 and 5. The dual tube 88 comprises a primary tube 92 and a secondary tube 94, the primary tube 92 being positioned radially outwardly of and concentrically surrounding the secondary tube 94. The secondary tube 94 is positioned radially inwardly of the primary tube 94. The primary and secondary tubes have a common wall 96. The valve assembly 90 extends radially inwardly from the inner tube and allows selective inflation and deflation of both the primary 92 and/or secondary 94 tube, as is further described below. The valve assembly 90 includes a primary valve 97 (FIGS. 3, 11, 12, 13, 14) and a physically separate secondary valve 98 (See FIGS. 5, 8, 9 and 10), each used to fill the primary tube 92 and the secondary tube 94, respectively.

When initially mounted on the wheel rim member 52 of the wheel assembly 42, the secondary tube 94 is deflated and the primary tube 92 is inflated through the primary valve 97. When the primary tube 92 is caused to have a leak and cannot maintain air pressure, the valve assembly system 90 is modified by incorporating the secondary valve in replacement of the primary valve to allow the insertion of air into the secondary tube 94, which is hermetically sealed from the primary tube 92. In this manner, the secondary tube 94 replaces the primary tube for maintaining tire pressure. When the primary tube 92 is in use, the secondary tube 94 is compressed within the well 62 of the wheel rim member 52, as shown in FIG. 3. When the secondary tube 94 is in use, the primary tube 92 is deflated and is compressed along the outer circumference of the tire 55 and along the interface of the secondary tube 92 and tire 55, as shown in FIG. 5.

A secondary valve member valve shoulder 106 forms an anchoring base for receipt and retention of either the primary or secondary valve stems. The valve shoulder is a generally cylindrical body mounted and affixed to the rim member 52 through the apertures 76 and 78 formed therein. The valve shoulder defines a base 107 with a lower annular flange 108, an internally-threaded 110 center bore 116, and an externally threaded top portion 112. The lower annular flange 108 is hermetically sealed to the secondary tube 94 by any known sealing process, such as vulcanization, to be in fluid communication with the secondary tube 94.

A valve shoulder retaining nut 114 has an internally-threaded center bore 117 for threadingly engaging the externally-threaded top portion 112 of the valve shoulder 106 to draw the bottom flange 108 of the valve shoulder 106 against the support wall 70 of the rim member 52, and to fix the position of the valve shoulder 106 in the apertures 76 and 78.

The primary valve 97 of the valve assembly 90, as best shown in FIG. 3, comprises a primary valve stem 100, preferably a Presta valve, which is slidably receivable in the center bore 116 of the valve shoulder. The primary valve stem is hermetically sealed through the common wall 96 and defines a continuous cavity 99 therethrough, to pneumatically communicate with the interior of the primary tube 92. The base 102 of the primary valve stem 100 defines an outwardly-extending annular flange 104. The annular flange 104 at the base 102 of the primary valve stem 100 is hermetically sealed to the shared wall 96 between the primary 92 and secondary 94 tubes by any known sealing process, such as vulcanization.

The outer diameter of the primary valve stem 100 is threaded to receive a primary valve retaining nut 118. The primary valve 100 is inserted through the center bore 116 of the valve shoulder 106 such that the annular flange 104 at the base 102 of the valve stem 100 engages the base 107 of the valve shoulder 106 to keep the primary valve stem 100 from pulling through the valve shoulder 106. The primary valve retaining nut 118 is threaded onto the external threads of the primary valve stem 100 to engage the top 109 of the valve shoulder 106 to fix the position of the primary valve stem 100 with respect to the valve shoulder 106 and to keep the primary valve 100 from retracting back through the center bore 116 of the valve shoulder 106.

The primary valve stem 100 has a conventional cap member 120 which can be threaded over the top end of the primary valve stem 100. The center bore 116 of the valve shoulder 106 has an inner diameter larger than the outer diameter of the cap 120 when mounted on the primary valve stem 100 for a purpose to be described later.

In this configuration, one can use the primary valve stem 100 to inflate and deflate the primary inner tube 92 inside the tire 55 when the tire is mounted on the wheel rim member 52.

Figure 8:
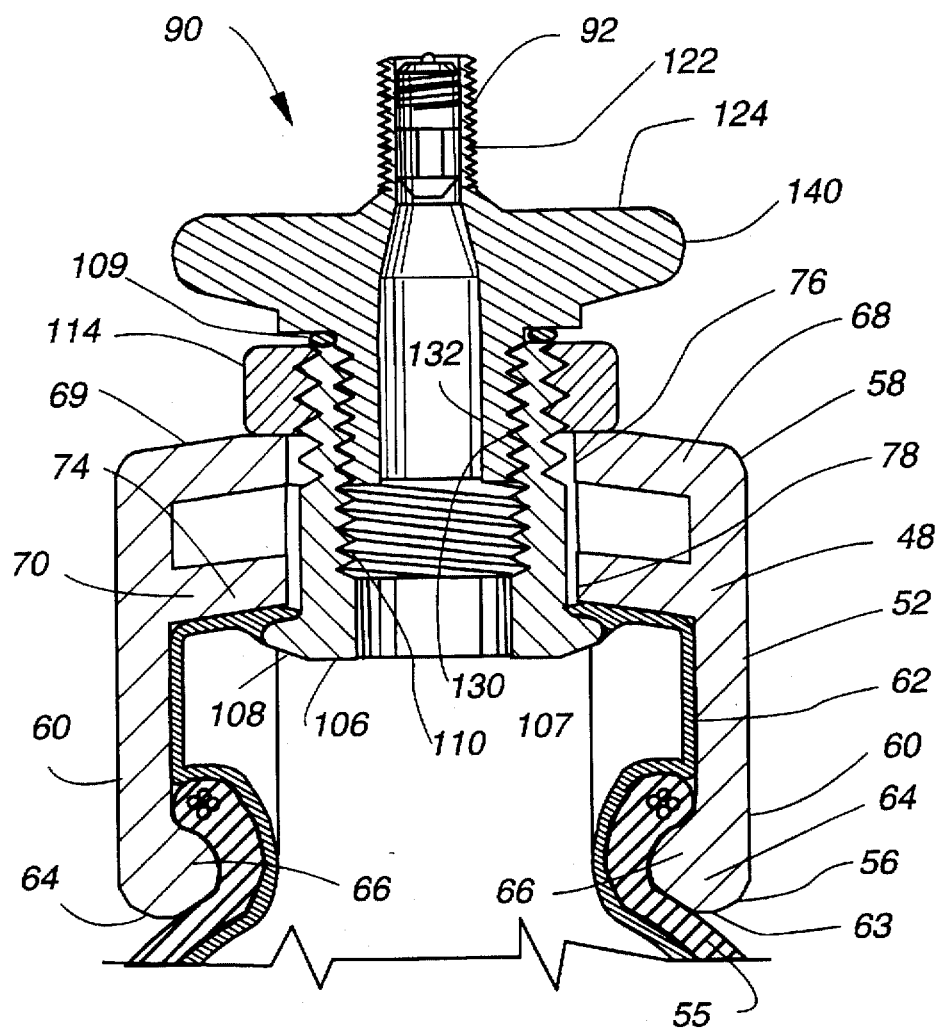
FIG. 8 is an axial section of a second embodiment of the secondary valve stem.
Figure 7:
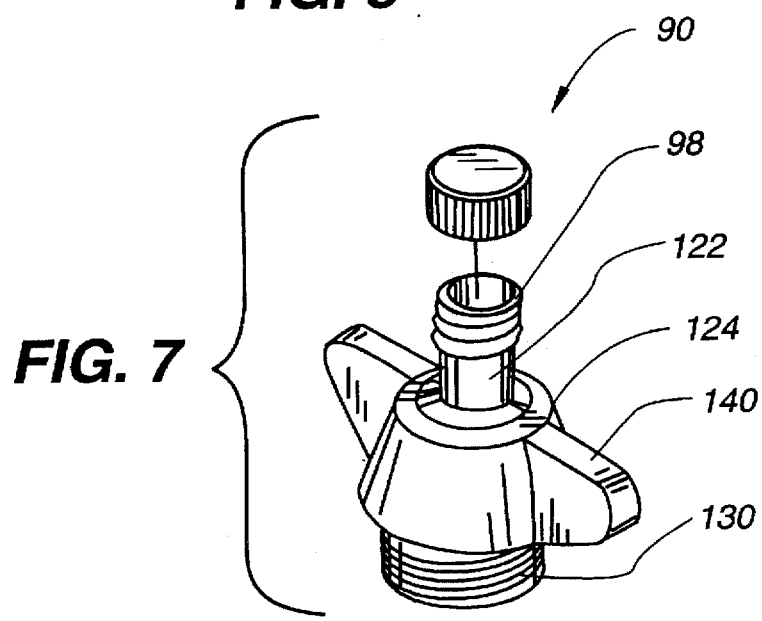
FIG. 7 is a perspective view of a first embodiment of the secondary valve stem having a cap.

Should the primary tube be punctured or ruptured, it is a straight forward procedure to implement the secondary tube and the secondary valve as a replacement. The conversion between the primary valve 97 and the secondary valve 98 requires the simple removal of the primary valve stem 100 from the valve shoulder 106, and then the connection of the secondary valve stem 122 to the valve shoulder 106 to inflate or deflate the secondary tube 94 as is described below in greater detail. Referring to FIGS. 5 and 7, the secondary valve 98 comprises a secondary valve stem 122, preferably a presta-type valve, mounted in a conversion base 124. In a first embodiment, the secondary valve 98 comprises a secondary valve stem 122 integrally formed with the conversion base 124, as shown in FIGS. 7 and 8.

Figure 9:
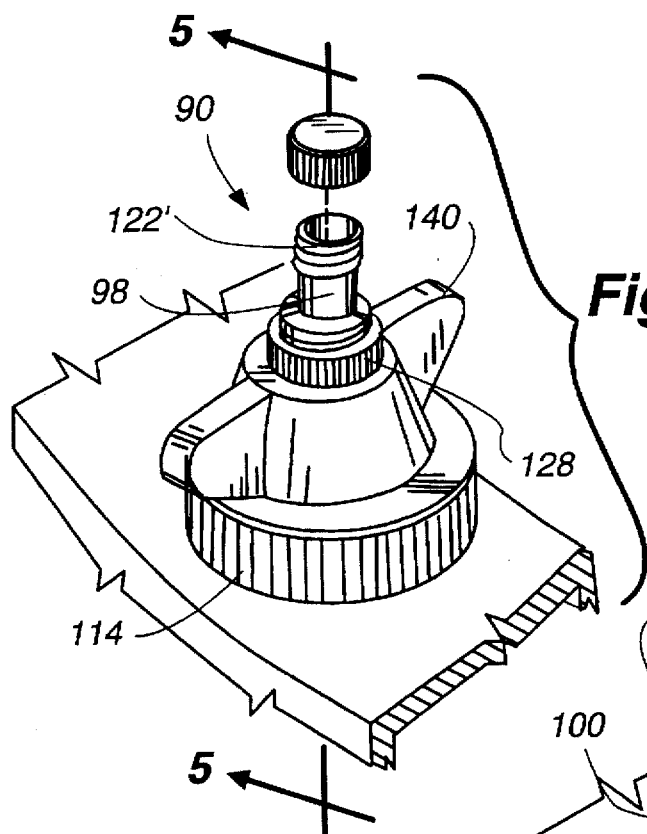
FIG. 9 is a fragmentary perspective of the second embodiment of the secondary valve stem protruding through the rim of a wheel.
Figure 11:
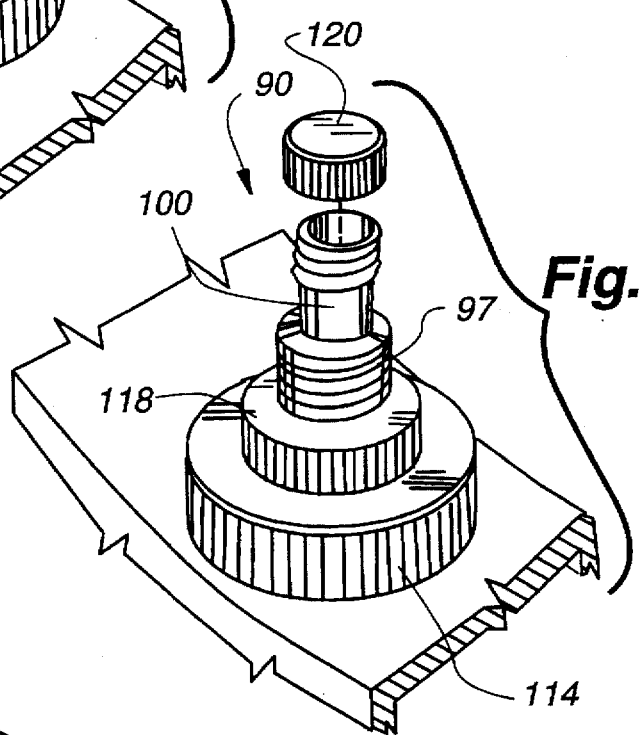
FIG. 11 is a fragmentary perspective of the primary valve stem.
Figure 6:
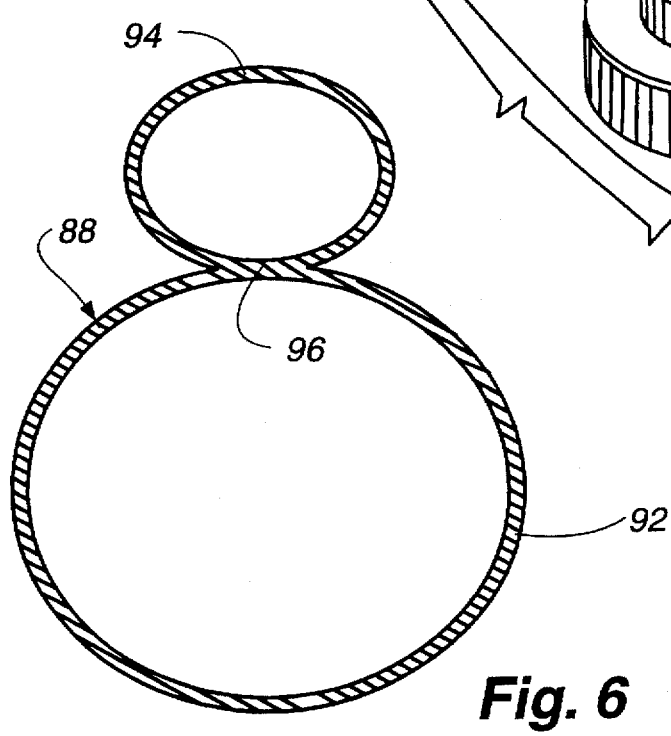
FIG. 6 is an enlarged section taken along line 6—6 of FIG. 4.

In a second embodiment, the secondary valve 98 comprises a secondary valve stem 122' separable from the conversion base 124' as shown in FIGS. 5, 9 and 10. The conversion base 124' has a center bore 126 with inner threads which releasably engage outer threads formed on the secondary valve stem 122'. A jam nut 128 is used to secure the secondary valve stem 122' to the conversion base 124'.

Both embodiments of the conversion base 124 and 124' have an externally-threaded bottom portion 130, which includes a center bore 132 for pneumatic communication with the secondary valve stem 122 or 122'. The diameter of the bottom portion 130 is designed to allow threaded mating with the internally-threaded center bore 116 of the valve shoulder 106. An O-ring seat 134 is formed at the top end of the valve shoulder 106 in conjunction with the conversion base 124, 124' for receiving an O-ring 136 to pneumatically seal the secondary valve 98 to the valve shoulder 106. The threading of the secondary valve 98 onto the valve shoulder 106 compresses the O-ring 136 into the O-ring seat 134 by engagement of a downwardly-facing annular shoulder 138 on the secondary valve 98. The bottom portion 130 of the secondary valve 98 can define diametrically opposed protrusions or wings 140 (FIGS. 9 and 10) for assisting in threading the secondary valve 98 into the valve shoulder.

In converting the valve system 90 from the primary 97 (FIGS. 3, 9 and 11) to the secondary valve 98 (FIGS. 5, 8 and 10), first the primary retaining nut 118 is removed from the primary valve stem 100. The primary valve stem 100 is then pushed through the center bore 116 of the valve shoulder 106 and into the interior of the secondary tube and consequently the tire 55, as shown in FIG. 5. It is important that the cap 120 remain on the primary valve stem 100 to reduce the risk of damage to the secondary tube 94. When the primary valve stem 100 is pushed through the center bore 116 of the valve shoulder 106, a portion of the primary tube 92 is collapsed along the interface between the tire 55 and the secondary tube 94, while at the same time extending and expanding the secondary tube 94 from its folded position along the base 74 of the well 62 in the tire rim member 52, as best shown in FIG. 5.

The secondary valve 98 is then threaded into the center bore 116 of the valve shoulder 106 to a point where the O-ring 136 is compressed between the secondary valve stem 106 and the O-ring seat 134 formed at the top 109 of the valve shoulder 106. The user can then inflate the secondary tube 94 to a sufficient pressure to continue operation of the bicycle 30. The inflation of the secondary tube 94 collapses the primary tube 92 against the tire 55 around the entire circumference of the secondary tube 94 (FIG. 5).

In operation, the dual tube and valve system 90 is utilized in a typical wheel assembly 42, with the primary tube 92 being used to maintain adequate tire pressure. Typically, two different types of flats are encountered when riding a bicycle 30. The first is a flat created by a puncture through the outer tire and the inner tube shown in FIG. 13, and the second is a "pinch-flat" where the tire strikes an object and is collapsed to a point where the side wall of the tire, including the primary tube, is pinched against the tire rim and causes the inner tube to burst at that pinched location, as shown in FIG. 14. The typical solution to either of these types of flats is to remove the tire 55 and attempt to patch the traditional tube (not shown) with a patch kit, or to replace the inner tube. The advantage of the instant invention is that the necessity of removing the tire 55 is eliminated because the user can simply push the primary valve 98 through the valve shoulder 106 into the tire 55 and secondary tube 94, attach the secondary valve 98 to the valve shoulder 106 and inflate the secondary tube 94 to adequate tire pressure for continued use of the bicycle 30.

Figure 13:
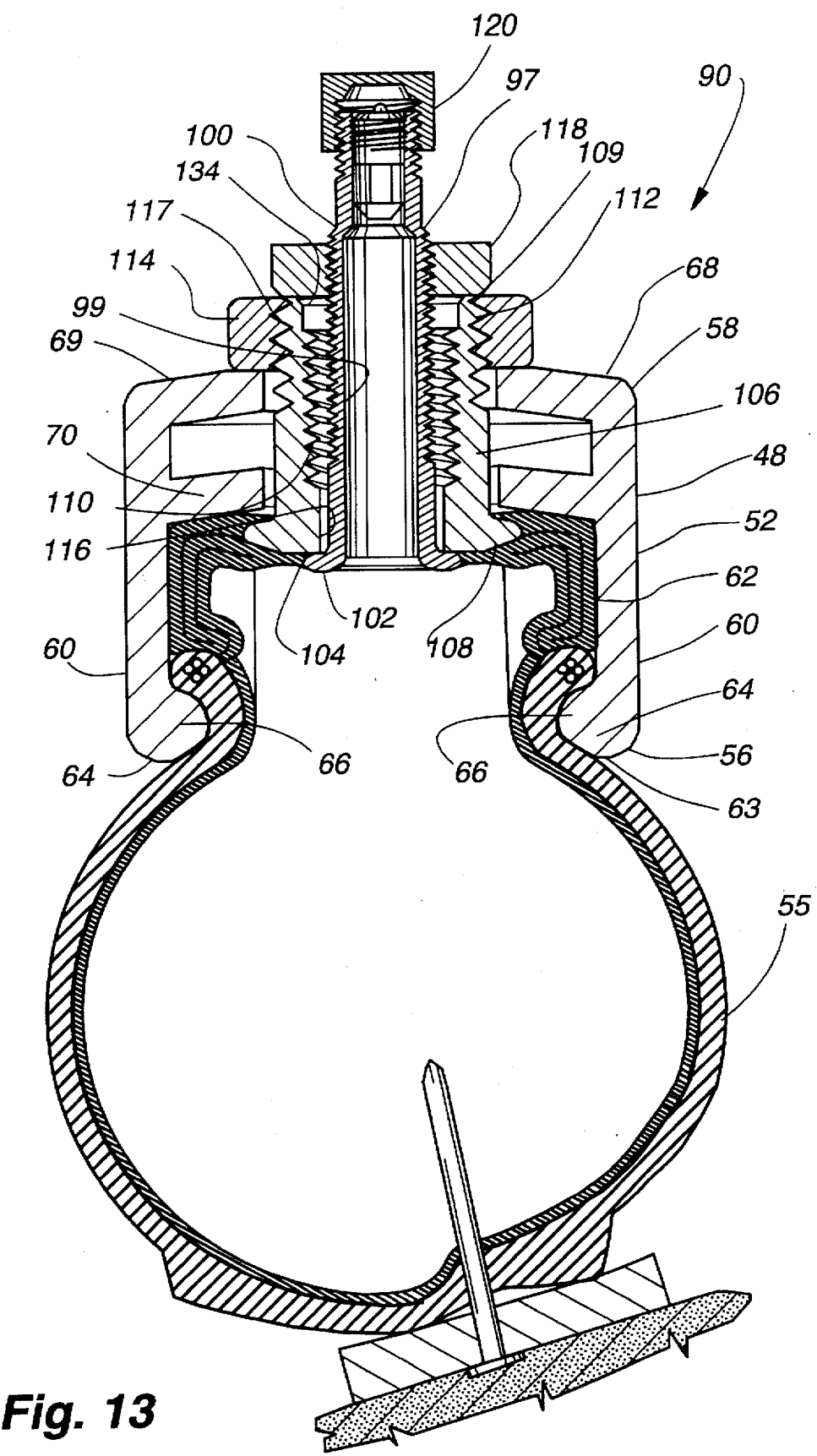
FIG. 13 is a transverse section of the double inner tube and valve system of the present invention mounted on a rim with a tire, illustrating a puncture flat.
Figure 14:
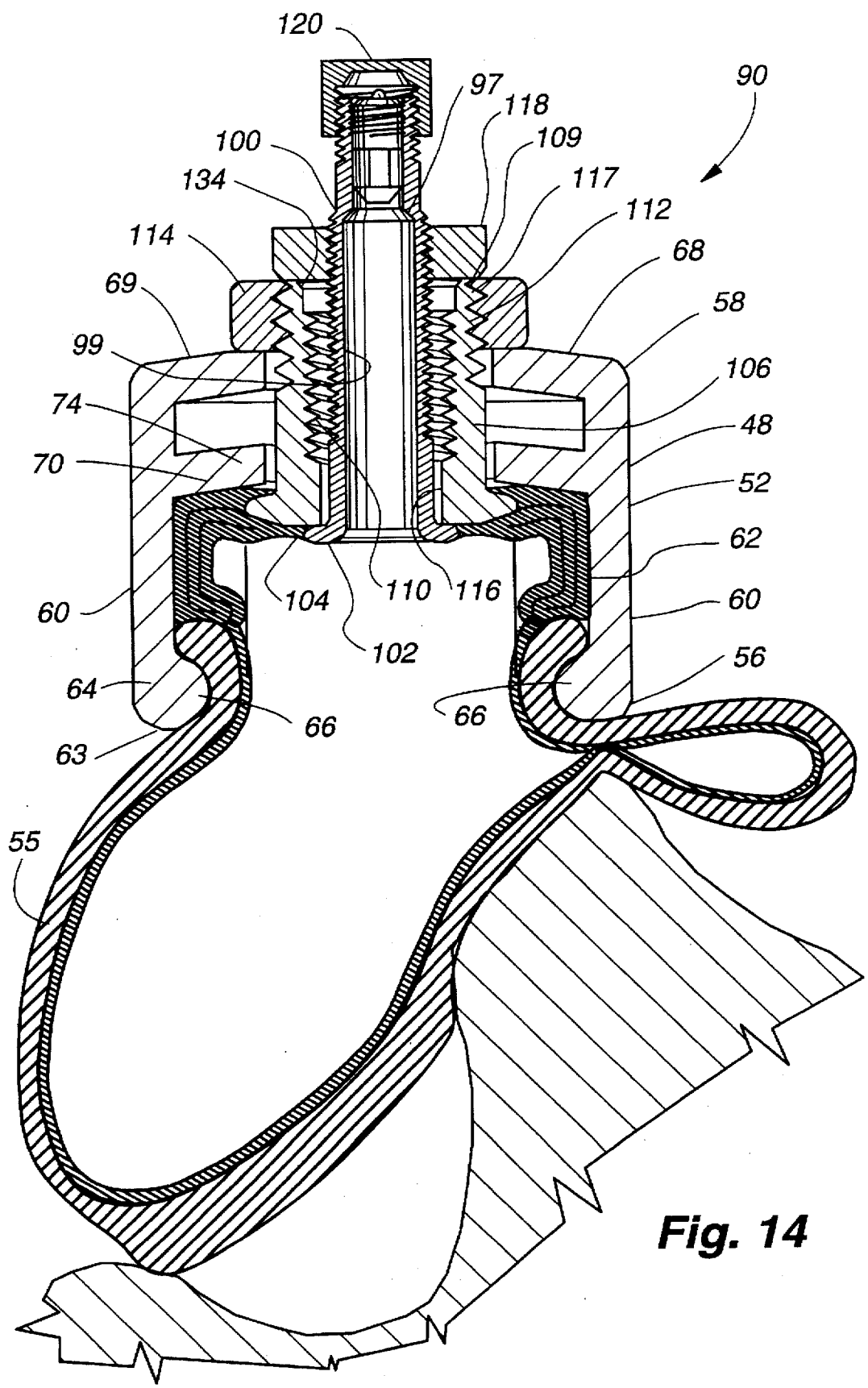
FIG. 14 is a transverse section similar to FIG. 13 of the double inner tube and valve system of the present invention mounted on a rim with a tire, illustrating a pinch flat.

When the primary tube 92 is being utilized, the secondary tube 94 is bunched up in the base 74 of the well 62 and thus is not subject to puncture, damage or pinch flats (see FIGS. 13 and 14). Since the secondary tube 94 is folded within the well 62, it is unlikely to be damaged during any use of the tire 55 when the primary tube 92 is used to maintain tire pressure. When the secondary tube 94 is being used to maintain tire pressure, the primary tube 92 is folded against the interface between the tire 55 and the secondary tube 94, thus forming a protective barrier to guard against further puncture wounds and also protecting the secondary tube 94 from the device that caused the first puncture hole.

Although the present invention has been described with a certain degree of particularity, it is understood that the present disclosure has been made by way of example, and changes in detail or structure may be made without departing from the spirit of the invention, as defined in the appended claims.

We claim:

1. An inner tube for use in a wheel assembly, said wheel assembly including a generally circular rim having a pair of spaced flanges forming an outwardly open annular well therearound and an aperture through the rim, a tire mounted on said rim so as to define an annular cavity in conjunction with said rim, said inner tube being positionable in said cavity between said rim and said tire, said inner tube comprising:

an inflatable portion having an inflatable primary tube positioned radially outward and concentrically surrounding an inflatable secondary tube, said primary and secondary tubes having a common wall; said primary tube positionable adjacent to said tire and said secondary tube positionable within said well between said primary tube and said rim when said inner tube is disposed in said cavity;

a valve assembly attached to said inflatable portion for insertion through said aperture in said rim when said inner tube is installed in said cavity, said valve assembly comprising:

a primary valve connected to said common wall and in fluid communication with said primary tube for inflation of said primary tube;

a secondary valve member for insertion through said aperture when said inner tube is installed between said rim and said tire in said cavity, said secondary valve member connected to a wall of said secondary tube and being in fluid communication with said secondary tube wherein said primary valve is slidably receivable in said secondary valve member in order to inflate said primary tube; and a secondary valve removably attachable to said secondary valve member for inflating said secondary tube, said valve assembly being selectively configurable to inflate said primary tube or said secondary tube depending on whether said primary valve is slidably received in and extends outwardly through said secondary valve member or said primary valve is not slidably received and said secondary valve is attached to said secondary valve member.

2. An inner tube as defined in claim 1, wherein:

said secondary valve member is a generally cylindrical valve shoulder defining a center bore for receiving said primary valve therethrough for inflation of said primary tube, said valve shoulder receiving and supporting said secondary valve for inflation of said secondary tube.

3. The inner tube according to claim 1, wherein:

said secondary valve member is a valve shoulder having a center bore, a top portion and a base:

said primary valve having a top end, a base defining an annular flange, a threaded center portion slidably receivable in said center bore so as to project above said top portion of said valve shoulder with said annular flange adjacent to said base of said valve shoulder; and a retaining nut engagable with said threaded center portion of said valve shoulder to cause said annular flange to engage said base portion of said valve shoulder, said retaining nut engagable with said top portion of said valve shoulder to clamp said primary valve in said shoulder.

4. The inner tube as defined in claim 3, wherein said primary valve is sized to pass through said center bore through said valve shoulder when said retaining nut is removed from said center portion.

5. The inner tube as defined in claim 4 wherein said center bore has internal threads engagable with external threads on a portion of said secondary valve when said primary valve is not slidably received in said center bore.

6. The inner tube as defined in claim 5, wherein said threaded portion of said secondary valve has diametrically opposed protrusions for a user to grasp to tighten the threaded portion in the valve shoulder when said secondary tube is to be inflated.

7. A wheel assembly comprising:

a circular rim having a base wall and opposing radially extending flanges defining an annular well around said rim and an aperture formed through said base wall;

a tire mounted on said rim defining an annular cavity in conjunction with said rim;

an inner tube positioned in said annular cavity comprising an inflatable primary tube positioned radially outward and concentrically surrounding an inflatable secondary tube, said primary and secondary tubes having a common wall, said primary tube being adjacent to said tire and said secondary tube positioned between said primary tube and stored entirely between said flanges within said well when deflated;

a valve assembly attached to said inner tube and positioned through said aperture in said rim, said valve assembly comprising:

a cylindrical valve shoulder communicating with and connected to a wall of said secondary tube;

a primary valve connected to said common wall and in fluid communication with said primary tube for inflation of said primary tube, said primary valve being removably positionable in said valve shoulder in order to inflate said primary tube;

a separate secondary valve member installable on said valve shoulder to be in fluid communication with said secondary tube for inflation of said secondary tube when installed on said valve shoulder; and wherein said valve assembly is selectively configurable to inflate said primary tube or said secondary tube depending on whether said primary valve is removably positioned in and extends outwardly through said valve shoulder or said primary valve is not positioned in said valve shoulder and said secondary valve is installed on said valve shoulder.

8. A wheel assembly as defined in claim 7, wherein;

said primary tube is collapsed against a portion of said tire opposite said rim well when said secondary tube is inflated.

9. A wheel assembly as defined in claim 8, wherein:

said valve shoulder has an inner diameter defining a center bore; and said primary valve is removably positioned in said center bore in said valve shoulder for use in inflating said primary tube, said primary valve having an outer diameter smaller than the inner diameter of said center bore to allow said primary valve to be selectively retracted through said bore into said secondary tube.

10. A dual inner tube for use in a bicycle wheel assembly having a circular rim with spaced flanges forming an outwardly open annular well therearound and a tire mounted on said rim, said tire and rim forming an annular cavity for receiving an inner tube therein, said rim having an aperture therein for passage of an inner tube valve therethrough, said dual tube comprising:

a primary inflatable annular tube and a secondary inflatable annular tube radially inward of said primary tube said tubes, joined together by a common wall portion;

an inner tube valve assembly positionable through said aperture in said rim for selectively inflating one of said primary or secondary tubes;

wherein said valve assembly comprises a generally cylindrical valve shoulder fastened to a wall of said secondary tube, said shoulder having a central bore therethrough communicating into said secondary tube a portion of said valve shoulder intended to fit through said aperture in said rim, a first retainer for securing the valve shoulder to the rim, an elongated, cylindrical, primary valve fastened to said common wall portion and communicating into said primary tube said primary valve removably extending through said central bore of said valve shoulder, and a second retainer for securing said primary valve in said valve shoulder.

11. The dual inner tube assembly according to claim 10 further comprising a removable secondary valve adapted to engage said valve shoulder when said primary valve is withdrawn from within said central bore through valve shoulder in order to inflate said secondary tube.

12. The dual inner tube assembly according to claim 10 wherein said portion of said valve shoulder has external threads and internal threads in said central bore and said first retainer is a threaded nut removably engaging said external threads to fasten said shoulder to said rim.

13. The dual inner tube assembly according to claim 12 wherein said primary valve has external threads and said second retainer is a threaded nut for removably engaging external threads on said primary valve to fasten said primary valve to said valve shoulder.

14. The dual inner tube assembly according to claim 12 wherein said secondary valve has a generally tubular body having external threads adapted to engage said internal threads in said central bore through said valve shoulder to fasten said secondary valve to said valve shoulder when said primary valve is withdrawn from said central bore through said valve shoulder.

15. The dual inner tube assembly according to claim 14 wherein said secondary valve tubular body has diametrically opposing wings for a user to grasp while hand tightening or loosening said secondary valve body in said center bore of said valve shoulder.

* * * * *